United States Patent
Vijayasankar et al.

(10) Patent No.: US 9,712,356 B2
(45) Date of Patent: Jul. 18, 2017

(54) MANAGING MULTIPLE MODULATION SCHEMES WITH CODED MODULATION INDICATOR IN DEFAULT-MODULATED PREAMBLE

(71) Applicant: TEXAS INSTRUMENTS INCORPORATED, Dallas, TX (US)

(72) Inventors: Kumaran Vijayasankar, Allen, TX (US); Timothy M. Schmidl, Dallas, TX (US); Ramanuja Vedantham, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 15/007,224

(22) Filed: Jan. 27, 2016

(65) Prior Publication Data

US 2016/0308700 A1    Oct. 20, 2016

Related U.S. Application Data

(60) Provisional application No. 62/147,482, filed on Apr. 14, 2015.

(51) Int. Cl.
| | |
|---|---|
| *H03C 3/00* | (2006.01) |
| *H04L 27/12* | (2006.01) |
| *H04L 27/00* | (2006.01) |
| *H04B 1/707* | (2011.01) |
| *H04L 29/06* | (2006.01) |
| *H04L 27/26* | (2006.01) |

(52) U.S. Cl.
CPC .......... *H04L 27/12* (2013.01); *H04L 27/0008* (2013.01); *H04B 1/707* (2013.01); *H04L 27/2601* (2013.01); *H04L 69/22* (2013.01)

(58) Field of Classification Search
CPC ...................................................... H04L 27/12
USPC ........................................................ 375/303
See application file for complete search history.

(56) References Cited

U.S. PATENT DOCUMENTS

| | | | | |
|---|---|---|---|---|
| 6,037,835 A | * | 3/2000 | Smith | H04B 1/406 329/316 |
| 2013/0121263 A1 | * | 5/2013 | Nguyen | H04W 72/0406 370/329 |
| 2013/0176998 A1 | * | 7/2013 | Choudhury | H04W 48/12 370/338 |

OTHER PUBLICATIONS

IEEE 802.15.4, Part 15.4: Low-Rate Wireless Personal Area Networks (LR-WPANs) Amendment 3: Physical Layer (PHY) Specifications for Low-Data-Rate, Wireless, Smart Metering Utility Networks, 2011.

(Continued)

*Primary Examiner* — Lihong Yu
(74) *Attorney, Agent, or Firm* — Lawrence J. Bassuk; Charles A. Brill; Frank D. Cimino

(57) ABSTRACT

A wireless transmission having a header and a payload is sent by transmitting a preamble of the header with a first modulation, wherein the preamble carries a coded modulation indicator. The payload and a remainder of the header are transmitted with a modulation associated with the coded modulation indicator. When the transmission is received, the preamble is demodulated in accordance with the first modulation. The coded modulation indicator is then decoded, and the payload and the remainder of the header are demodulated in accordance with the modulation indicated by the decoded modulation indicator.

3 Claims, 3 Drawing Sheets

(56) References Cited

OTHER PUBLICATIONS

IEEE 802.11ah: Advantages in Standards and Further Challenges for Sub 1 GHz Wi-Fi, Stefan Aust, et al., Workshop on Telecommunications: From Research to Standards, IEEE ICC, 2012.
IEEE P802.15.4e, Part 15.4: Low-Rate Wireless Personal Area Networks (LR-WPANS), IEEE 802.15.4e, 2012.
Field Area Network Working Group (FANWG), Wi-Sun Alliance, Technical Profile Specification, Field Area Network, 2016.

* cited by examiner

MANAGING MULTIPLE MODULATION SCHEMES WITH CODED MODULATION INDICATOR IN DEFAULT-MODULATED PREAMBLE

This application claims 35 USC 119 priority to U.S. Provisional Application No. 62/147,482 filed on Apr. 14, 2015.

FIELD

The present work relates generally to wireless communication and, more particularly to management of different modulations available for wireless communication.

BACKGROUND

The documents listed below are incorporated herein by reference:
1. IEEE 802.15.4g, Part 15.4: Low-Rate Wireless Personal Area Networks (LR-WPANs) Amendment 3: Physical Layer (PHY) Specifications for Low-Data-Rate, Wireless, Smart Metering Utility Networks;
2. IEEE 802.11ah: Advantages in Standards and Further Challenges for Sub 1 GHz Wi-Fi, Stefan Aust, IEEE ICC 2012;
3. Part 15.4: Low-Rate Wireless Personal Area Networks (LR-WPANs), IEEE 802.15.4 e-2012; and
4. Field Area Network Working Group Field Area Network Technical Profile Specification, WI-SUN FAN.

Wireless communication standards are intended to provide a framework for realizing effective wireless communication networks. Although such standards specify many details important for effective operation, they do not necessarily mandate any particular physical layer (PHY) modulation scheme. This allows for the use of various different modulation schemes. Thus, any given wireless communication device operating in a network may support one or more PHY modulation schemes. As an illustrative example, IEEE STD 802.15.4g identifies the following three modulations available for use in the network: frequency shift keying (FSK); orthogonal frequency division multiplexing (OFDM); and direct sequence spread spectrum (DSSS).

In networks compliant with IEEE STD 802.15.4g, a conventional PHY transmit frame is composed of a header portion that includes a preamble, and a payload portion that follows the header. For multiple available modulation schemes, each type of modulation has its own associated header, and the preamble carries information that enables proper reception of the entire frame. Consider now a conventional wireless communication device configured to detect frames having a specific modulation type. That is, for each frame, the receiver looks for and decodes only the header type associated with the modulation type that the receiver is currently using. Solutions are needed for effective communication among devices in a single network (e.g., IEEE 802.15.4g compliant network or other sub 1 GHz network) that use different modulations.

Continuing with the IEEE 802.15.4g example, that standard provides for interoperability among wireless communication devices by specifying FSK as a default modulation for the PHY header. Information in the FSK-modulated header identifies the modulation used for transmission of the payload that follows. The present work recognizes a disadvantage of the default FSK header. Note first that FSK, OFDM and DSSS have respectively different sensitivities, and thus correspondingly different ranges (distances) over which communication can be carried out. The range for DSSS is greater than for OFDM, and the range for OFDM is greater than for FSK. The shorter range FSK preamble limits effective communication ranges within the network. This can be seen by recognizing that any device that supports relatively lower modulations (e.g., OFDM or DSSS), but is too distant to detect the FSK preamble, will be prevented from realizing the longer communication ranges associated with the lower modulations it supports.

Another possible solution is to use the lowest of the multiple available modulations as the default modulation. However, the time duration of a header modulated with the lowest modulation would significantly degrade throughput. Thus, a relatively higher default modulation limits range, and a relatively lower default modulation limits throughput.

BRIEF DESCRIPTION OF THE DRAWINGS

The drawings referenced herein are briefly identified as follows.

DETAILED DESCRIPTION

Example embodiments of the present work place a coded modulation indicator (CMI) in the preamble, and modulate the preamble with a default modulation that is the highest of the available modulations. A modulation indicator that identifies the modulation used for transmission of the payload is coded with a relatively high coding rate to produce the CMI. A unique CMI is thus provided for each modulation available for transmission of the payload. The relatively high coding rate permits relatively large Hamming distances between the CMIs (which are the codewords). The receiver can thus successfully detect the CMI even with a relatively high error rate. This effectively decreases the sensitivity of the high modulation, so its range is correspondingly increased.

Figure 1:
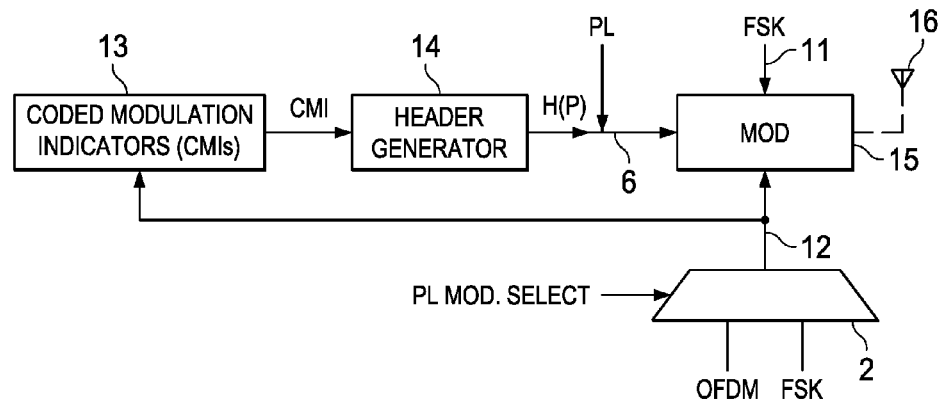
FIG. 1 diagrammatically illustrates a transmitter apparatus according to example embodiments of the present work.

FIG. 1 diagrammatically illustrates a transmitter apparatus according to example embodiments of the present work. Some conventional components not necessary to understanding the present work may be omitted to improve clarity. In some embodiments, the apparatus is compliant with IEEE STD 802.15.4g. A modulator 15 has inputs 11 and 12 which respectively indicate the modulation to be used for the preamble and payload. In the illustrated example, the preamble input 11 is FSK and the payload input 12 is FSK or OFDM, as selected by selector 2 under control of a payload modulation select signal (PL MOD SELECT). The payload modulation selected at 2 and signaled at 12 is also used to select the appropriate CMI (OFDM or FSK) at 13. A header generator 14 receives the selected CMI and generates a header including the CMI in the preamble. The header with preamble (designated H(P)) is provided to the modulator 15 at 6, together with the payload PL. The frame is transmitted, with the preamble and payload respectively modulated as indicated at 11 and 12, via an antenna arrangement 16 coupled to the modulator 15. The payload modulation indicated at 12 is also used to modulate the remainder of the header (i.e., the portion of the header other than the preamble).

Figure 2:
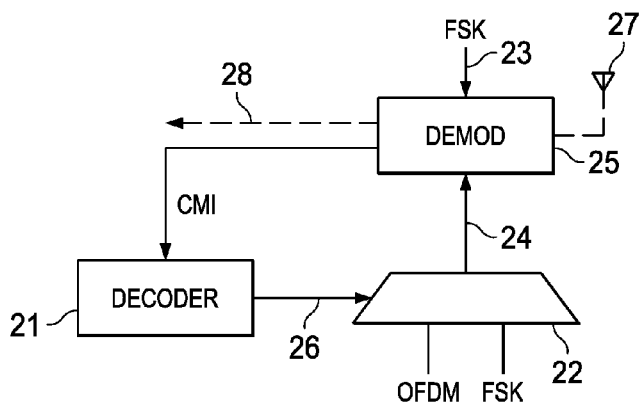
FIG. 2 diagrammatically illustrates a receiver apparatus according to example embodiments of the present work.

FIG. 2 diagrammatically illustrates a receiver apparatus according to example embodiments of the present work. Some conventional components not necessary to understanding the present work may be omitted to improve clarity. In some embodiments, the apparatus is compliant with IEEE STD 802.15.4g. A demodulator 25 receives a transmitted frame via an antenna arrangement 27 coupled to the demodulator 25. Inputs 23 and 24 respectively indicate the modulations used for the preamble and the payload. In the illustrated example, the preamble input 23 is FSK and the payload input 24 is FSK or OFDM, as selected by selector 22 under control of a selection signal 26. The demodulator 25 demodulates the preamble in accordance with the modulation indicated at 23, and provides the CMI to a decoder 21 that decodes the CMI. The decoding result is provided as the selection signal 26, indicating which of FSK and OFDM was used to modulate the payload. The payload and the remainder of the header are then demodulated in accordance with the payload input 24. The demodulated frame is provided at 28 for further receive processing.

Figure 3:
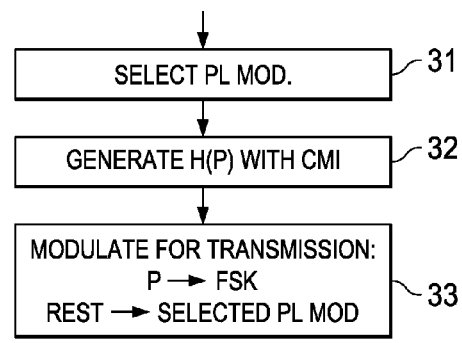
FIG. 3 illustrates transmit operations according to example embodiments of the present work.

FIG. 3 illustrates transmit operations according to example embodiments of the present work. In some embodiments, the operations of FIG. 3 may be performed by the apparatus described above relative to FIG. 1. The payload modulation (PL MOD) is selected at 31. The header, with the appropriate CMI in the preamble, is generated at 32. Modulation for transmission occurs at 33, using FSK for the preamble P, and using the modulation selected at 31 (FSK or OFDM in some embodiments) for the rest of the transmission, namely, for the payload and the remainder of the header.

Figure 4:
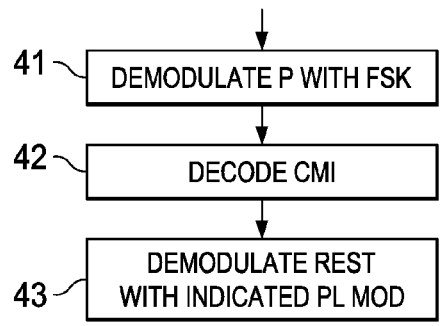
FIG. 4 illustrates receive operations according to example embodiments of the present work.

FIG. 4 illustrates receive operations according to example embodiments of the present work. In some embodiments, the operations of FIG. 4 may be performed by the apparatus described above relative to FIG. 2. At 41 the preamble P with the CMI is demodulated in accordance with FSK. The CMI is decoded at 42. The rest of the transmission, namely, the payload and the remainder of the header, is demodulated at 43 in accordance with the payload modulation (PL MOD) indicated by the decoding result from 42.

Figure 5:
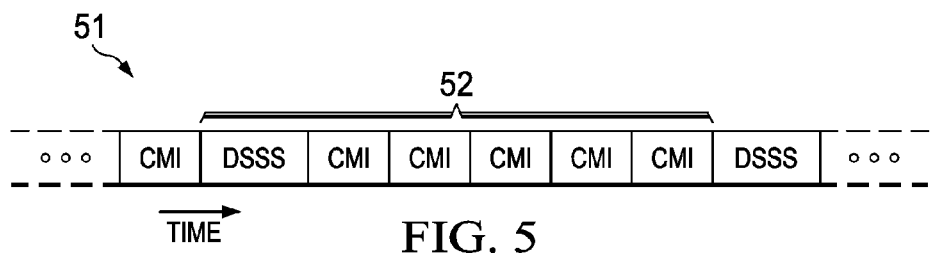
FIG. 5 illustrates an example of a hopping schedule according to example embodiments of the present work.

Although it may not be possible as a practical matter to modify an FSK preamble to match the sensitivity and range of some low modulations (e.g., DSSS), such low modulations may be accommodated using a modulation hopping schedule according to example embodiments of the present work. FIG. 5 illustrates an example of such a modulation hopping schedule 51. Each of a sequence of transmission intervals is allocated for transmission of a respective frame. In the FIG. 5 example, during a periodic time cycle 52 consisting of six transmission intervals, there are five intervals designated CMI, and one interval designated DSSS. In some embodiments, the CMI intervals are provided for transmit/receive operations performed in accordance with the CMI techniques described above relative to FIGS. 1-4. For the intervals designated DSSS, transmit/receive operations use conventional DSSS frames. A receiver device determines a modulation hopping schedule suitable for its reception operations, and can transmit this schedule to other network devices via available network control resources. When a first device wishes to transmit a frame to a second device, the first device selects a desired modulation for the payload, and then consults the modulation hopping schedule of the second (receiving) device to identify the next modulation hop suitable for the selected payload modulation. In some embodiments, the CMI intervals are suitable for either FSK or OFDM as payload modulation, as described above. In some instances, the first device may need to delay the desired transmission until the next suitable hop. In some embodiments, the first and second devices maintain the same modulation until the frame and any corresponding acknowledgment transmission is complete (similar to the method described in document 4 incorporated by reference hereinabove).

Various embodiments use various hopping schedules tailored to the operational environment. For example, dedicated transmission intervals can be assigned for every available modulation scheme, with each modulation scheme using its own preamble. In some embodiments, a modulation hopping schedule such as shown in FIG. 5 is time-wise overlaid on a conventional channel (e.g., frequency) hopping schedule, such that each channel hop has a time-wise associated modulation hop. The receiver tunes to the appropriate channel hop at the appropriate time, and knows the applicable modulation technique from the associated modulation hop.

Figure 6:
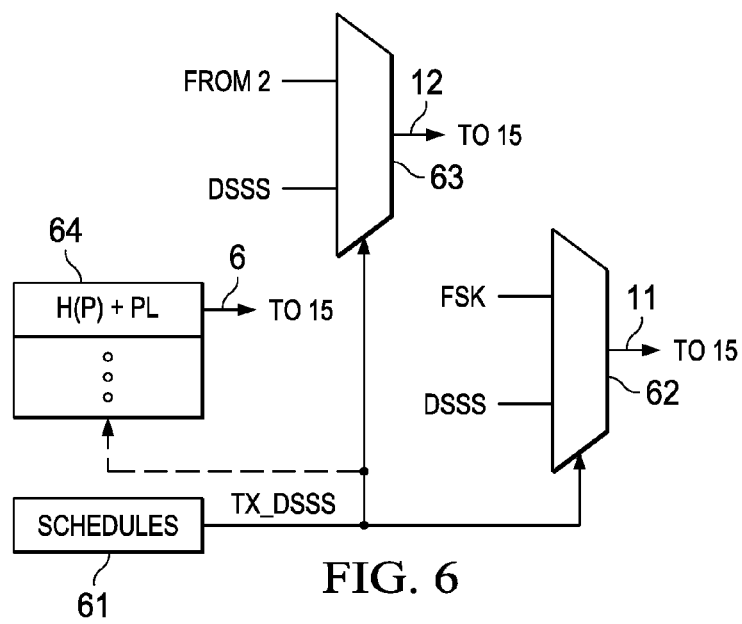
FIG. 6 diagrammatically illustrates a transmit scheduler according to example embodiments of the present work.

FIG. 6 diagrammatically illustrates a transmit scheduler suitable for operation with the transmitter of FIG. 1 to implement a modulation hopping schedule such as shown in FIG. 5 according to example embodiments of the present work. The transmit scheduler is controlled by schedules (see 61) received from other active devices. The schedule controller 61 activates a signal TX_DSSS to indicate when a receiver of interest will demodulate in accordance with DSSS (see e.g., DSSS intervals in FIG. 5). When TX_DSSS is active, the preamble and payload modulation inputs 11 and 12 of modulator 15 (see FIG. 1) are both supplied with a DSSS indication by operation of selectors 62 and 63 under control of TX_DSSS. Otherwise, for CMI intervals of the receiver, the TX_DSSS is inactive, so the inputs 11 and 12 of modulator 15 are respectively supplied with FSK and the output of selector 2 (see also FIG. 1), again via selectors 62 ad 63 under control of (inactive) TX_DSSS. FIG. 6 also illustrates that a frame (H(P)+PL) nay be buffered at 64 until the state of TX_DSSS indicates occurrence of an interval consistent with the selected payload modulation.

Figure 7:
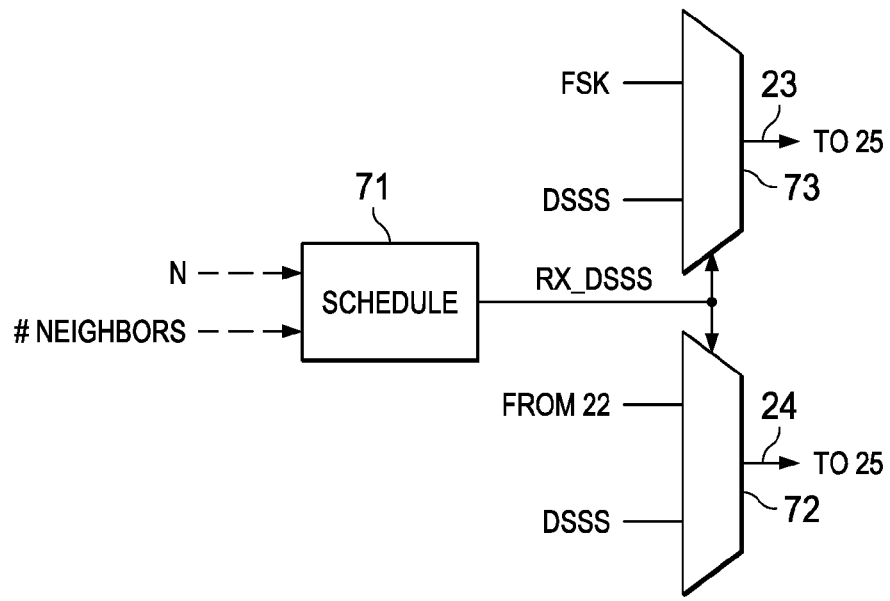
FIG. 7 diagrammatically illustrates a receive scheduler according to example embodiments of the present work.

FIG. 7 diagrammatically illustrates a receive scheduler suitable for operation with the receiver of FIG. 2 to implement a modulation hopping schedule such as shown in FIG. 5 according to example embodiments of the present work. The receive scheduler is controlled by the receiver's hopping schedule (see 71). The signal RX_DSSS is driven active by the schedule controller 71 to indicate a DSSS interval. When RX_DSSS is active, the preamble and payload demodulation inputs 23 and 24 of demodulator 25 (see FIG. 2) are supplied with DSSS via selectors 72 and 73 under control of RX_DSSS. Otherwise, for CMI intervals, RX_DSSS is inactive, so the inputs 23 and 24 of demodulator 25 are respectively supplied with FSK and the output of selector 22 (see also FIG. 2), again by operation of selectors 73 and 72 under control of (inactive) RX_DSSS.

The number of neighboring wireless communication devices that a given wireless communication device interacts with using the various available modulations can vary with network topology and traffic patterns. The use of a predetermined fixed modulation hopping schedule may in some instances cause large overall delays. Some embodiments attempt to mitigate this effect by dynamically updating the modulation hopping schedule based on the total number of active neighbors. The updated schedule is then advertised to the active neighbors.

Figure 8:
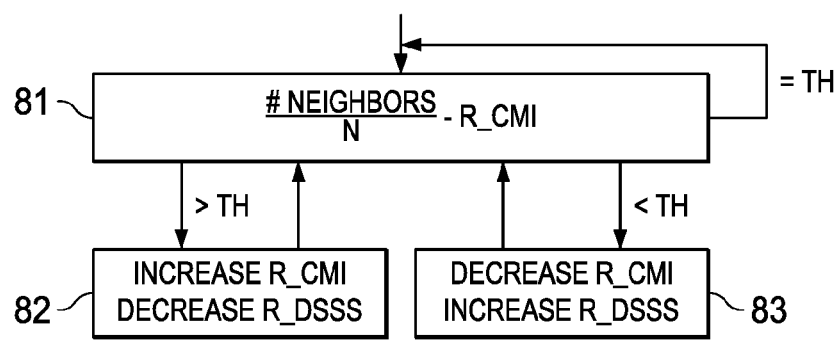
FIG. 8 illustrates schedule adjustment operations according to example embodiments of the present work.

FIG. 8 illustrates operations for dynamically updating a modulation hopping schedule according to example embodiments of the present work. In the example of FIG. 8, R_CMI represents the fraction of time, within a periodic time cycle of the hopping schedule, that CMI techniques such as described with respect to FIGS. 1-4 are implemented, and R_DSSS represents the fraction of time within the cycle that conventional DSSS is implemented. At 81, the difference between (1) R_CMI and (2) the ratio of the total number of active neighbors to the total number N of network-supported modulations is analyzed. If the difference is equal to a threshold (TH), no schedule update occurs. If the difference at 81 is less than TH, then R_CMI and R_DSSS are respectively decreased and increased at 83, after which operations return to 81. If the difference at 81 is greater than TH, then R_CMI and R_DSSS are respectively increased and decreased at 82, after which operations return to 81. In some embodiments, the amount of all increases and decreases at 82 and 83 is equal to the threshold TH. In some embodiments, R_CMI and R_DSSS are respectively initialized to 0.6 and 0.4, and TH is 0.1.

As an illustrative example of the operations of FIG. 8 using the aforementioned parameters, assume a modulation hopping schedule of the type shown in FIG. 5, wherein the periodic time cycle (see 52 in FIG. 5) contains ten transmission intervals, of which six are designated CMI intervals and four are designated DSSS intervals. Depending on the result of the analysis at 81, the composition of the periodic time cycle could be changed either to 7 CMI intervals and 3 DSSS intervals (at 82), or to 5 CMI intervals and 5 DSSS intervals (at 83).

In some embodiments, the schedule controller 71 of FIG. 7 implements the operations shown in FIG. 8, based on the total number of active neighbors and the total number N of network-supported modulations. Such embodiments are indicated by broken line in FIG. 7.

Although example embodiments are described above in detail, this does not limit the scope of the present work, which may be practiced in a variety of embodiments.

What is claimed is:

1. A method of receiving wireless transmissions that each have a header and a payload, comprising:
    (a) demodulating a preamble of the header in accordance with a first modulation;
    (b) decoding a coded modulation indicator carried in the preamble;
    (c) demodulating the payload and a remainder of the header in accordance with a modulation indicated by the decoded modulation indicator;
    (d) selecting the coded modulation indicator from a plurality of coded modulation indicators respectively associated with a plurality of modulations available for transmission;
    (e) the plurality of modulations including the first modulation and a second modulation that is lower than the first modulation;
    (f) scheduling the wireless transmissions, in accordance with a modulation schedule for wireless transmission reception, to occur respectively in a first set of transmission intervals, including scheduling further wireless transmissions in accordance with the modulation schedule to occur respectively in a second set of transmission intervals that is disjoint from the first set, and including demodulating the headers and payloads of the further wireless transmissions in accordance with a third modulation that is different from the first and second modulations and is specified by the modulation schedule;
    (g) the third modulation is lower than the second modulation; and
    (h) the first and second sets of transmission intervals both occur during a periodic time cycle, and including dynamically updating the modulation schedule by adjusting respective sizes of the first and second sets of transmission intervals inversely relative to one another based on a total number of neighboring active wireless communication devices.

2. An apparatus for receiving wireless transmissions that each have a header and a payload, comprising:
    (a) a demodulator configured for demodulating a preamble of the header in accordance with a first modulation; and
    (b) a decoder coupled to said demodulator and configured for decoding a coded modulation indicator carried in the preamble; wherein said demodulator is further configured for demodulating the payload and a remainder of the header in accordance with a modulation indicated by the decoded modulation indicator
    (c) the coded modulation indicator is selected from a plurality of coded modulation indicators respectively associated with a plurality of modulations available for transmission;
    (d) the plurality of modulations includes said first modulation and a second modulation that is lower than said first modulation;
    (e) the wireless transmissions are scheduled, in accordance with a modulation schedule for wireless transmission reception, to occur respectively in a first set of transmission intervals, further wireless transmissions are scheduled in accordance with the modulation schedule to occur respectively in a second set of transmission intervals that is disjoint from the first set, and including a scheduler coupled to the demodulator for implementing the modulation schedule, the scheduler being configured for directing the demodulator to demodulate the headers and payloads of the further wireless transmissions in accordance with a third modulation that is different from the first and second modulations and is specified by the modulation schedule; and
    (f) the first and second sets of transmission intervals both occur during a periodic time cycle, and the scheduler is configured to dynamically update the modulation schedule by adjusting respective sizes of the first and second sets of transmission intervals inversely relative to one another based on a total number of neighboring active wireless communication devices.

3. The apparatus of claim 1, provided as an apparatus compliant with IEEE STD 802.15.4g.

* * * * *